(12) United States Patent
Blanc et al.

(10) Patent No.: US 8,085,789 B2
(45) Date of Patent: *Dec. 27, 2011

(54) ALGORITHM AND SYSTEM FOR SELECTING ACKNOWLEDGMENTS FROM AN ARRAY OF COLLAPSED VOQ'S

(75) Inventors: Alain Blanc, Tourrettes sur Loop (FR); Rene Glaise, Nice (FR); Francois Le Maut, Nice (FR); Michel Poret, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/365,091

(22) Filed: Feb. 3, 2009

(65) Prior Publication Data

US 2009/0141733 A1 Jun. 4, 2009

Related U.S. Application Data

(63) Continuation of application No. 10/894,681, filed on Jul. 20, 2004, now Pat. No. 7,486,683.

(30) Foreign Application Priority Data

Jul. 23, 2003 (EP) .................................... 03368074

(51) Int. Cl.
*H04L 12/28* (2006.01)
(52) U.S. Cl. .................. 370/395.72; 370/368; 370/374; 370/381

(58) Field of Classification Search .................. 370/368, 370/374, 378, 379, 381–383, 395.1, 412–419, 370/428; 365/230.03
See application file for complete search history.

(56) References Cited

U.S. PATENT DOCUMENTS

| | | | | |
|---|---|---|---|---|
| 5,923,656 A * | 7/1999 | Duan et al. | ................. | 370/395.4 |
| 5,978,303 A * | 11/1999 | Takasugi et al. | ......... | 365/230.03 |
| 6,449,283 B1 * | 9/2002 | Chao et al. | .................... | 370/461 |
| 6,456,590 B1 * | 9/2002 | Ren et al. | ...................... | 370/229 |
| 7,120,160 B2 * | 10/2006 | Takase et al. | ................. | 370/415 |
| 7,274,701 B2 * | 9/2007 | Boduch et al. | ............. | 370/395.4 |
| 2001/0019512 A1 * | 9/2001 | Hidaka | ..................... | 365/230.03 |
| 2001/0043502 A1 * | 11/2001 | Ooishi | ..................... | 365/230.03 |
| 2004/0165598 A1 * | 8/2004 | Shrimali et al. | ......... | 370/395.42 |

* cited by examiner

*Primary Examiner* — Aung S Moe
*Assistant Examiner* — Vincelas Louis
(74) *Attorney, Agent, or Firm* — Yuanmin Cai; Khanh Tran

(57) ABSTRACT

A method for selecting packets to be switched in a collapsed virtual output queuing array (cVOQ) switch core, using a request/acknowledge mechanism is disclosed. An egress location for an ingress port is selected based on degrees of freedom for the selection mechanism. The degree of freedom can be derived from the collapsed virtual output queuing array by determining a number of egress locations to which an ingress port may send packets and determining a number of ingress ports from which an egress location can receive packets. Analyzing all the queued packets for assignment to an egress location, starting with a lesser degree of freedom and ending with a greater degree of freedom provides efficient switching allocations and acknowledgements.

20 Claims, 8 Drawing Sheets

US 8,085,789 B2

ALGORITHM AND SYSTEM FOR SELECTING ACKNOWLEDGMENTS FROM AN ARRAY OF COLLAPSED VOQ'S

CROSS REFERENCE TO RELATED PATENT APPLICATIONS

The following patent application is a copending, parent of the present application and is The above applications is incorporated herein by reference:

U.S. patent application Ser. No. 10/894,681, Alain Blanc et al., "Algorithm and System For Selecting Acknowledgments From An Array of Collapsed VOQ's", filed on Jul. 20, 2004, now U.S. Pat. No. 7,486,683.

FIELD

The present invention relates to high speed switching of data packets in general and, is more particularly concerned with an algorithm and a system that allow to select which acknowledgements are to return, from an array of collapsed VOQ's situated in the core of a switch fabric, in response to requests previously issued from fabric ingress port adapters, so as to implement an efficient flow control mechanism.

BACKGROUND

The use of a shared memory switch core equipped with port Output Queues (OQ's) whose fillings are monitored so that incoming packets can be held in ingress VOQ's to prevent output congestion is known in the prior art. FIG. 1 and related description of the first cross referenced patent application set forth above give a detailed description of the prior art shared memory switch system and is fully incorporated herein by reference.

Algorithms to select which ones of the ingress queues should be served at each packet cycle, so as to maximize the use of the available switching resources, are known from the art. However, they have been devised to operate with a crossbar type of switch i.e., with a memoryless matrix of switches that can establish solid connections between a set of inputs and outputs of a switch core, for a time long enough to allow the transfer of a packet from all IA's that have something to forward and have been selected. Algorithms tend to optimize the use of the matrix thus, solving the contention between inputs contending for a same output. Typically, the purpose of this type of algorithms is to reassess a new match at each packet cycle. The most known of those algorithms is referred to as iSLIP. A description of it can be found in "The iSLIP Schedulinga Algorithm for Input-Queued Switches" by Nick McKeown, IEEE/ACM TRANSACTIONS ON NETWORKING, VOL. 7, NO. 2, April 1999. Hence, iSLIP and its many variants that have been studied and sometimes implemented in commercial products, are essentially done for crossbar switches and do not fit with the type of switch core considered by the invention where switching is achieved through the use of a shared-memory (112) which is known to be much more flexible than a simple crossbar.

Indeed, with a shared-memory core, a packet may be admitted even though the output through which it must exit the fabric is not currently available. In this architecture each IA is implicitly authorized to forward the received packets (105, FIG. 1 of referenced application 1. cited above) to the switch core as soon as they arrive. Obviously, the central shared-memory is not an infinite resource and backpressure may have to be applied to all IA's in order to prevent the admission of further packets if central resource gets exhausted because one or more outputs are congested. This is generally done on a per priority basis. Backpressure mechanism stops lower priorities first. On the contrary of the crossbar, this mode of operation does not require any form of scheduling of the packets forwarded by IA's and there is no central scheduler needed.

This scheme works well as long as the time to feed the information back to the source of traffic i.e., the VOQ's of IA's (100, referenced application 1. cited above), is short when expressed in packet-times. However, packet-time reduces dramatically in the most recent implementations of switch fabrics where the demand for performance is such that aggregate throughput must be expressed in tera (1012) bits per second. As an example, packet-time can be as low as 8 nanoseconds (109 sec.) for 64-byte packets received on OC-768 or 40 Gbps (109 bps) switch port having a 1.6 speedup factor thus, actually operating at 64 Gbps. As a consequence, round trip time (RTT) of the flow control information is far to be negligible as this used to be the case with lower speed ports. As an example of a worst case traffic scenario, all input ports of a 64-port switch may have to forward packets to the same output port eventually creating a hot spot. It will take RTT time to detect and block the incoming traffic in all VOQ's involved. If RTT is e.g.: 16 packet-times then, 64×16=1024 packets may have to accumulate for the same output in the switch core. A RTT of 16 packet-times corresponds to the case where, for practical considerations and mainly because of packaging constraints, distribution of power, reliability and maintainability of a large system, port adapters cannot be located in the same shelf and have to interface with the switch core ports through cables. Then, if cables (150) are 10 meter long, because light is traveling at 5 nanoseconds per meter, it takes 100 nanoseconds or about 12 packet-times (8 Ns) to go twice through the cables. Then, adding the internal processing time of the electronic boards this may easily add up to the 16 packet-times used in the above example.

OBJECT OF THE INVENTION

Therefore, shared-memory switches can no longer operate with a simple backpressure mechanism. IA's must hold the incoming packets, forwarding requests (109) instead to the switch core, and wait until they receive acknowledgments (140). Hence, on the basis of the received requests and of the returned acknowledgments, switch core maintains a status of all ingress queues under the form of a cVOQ array (160) which permits to best select the acknowledgments to return to the IA's. Like with crossbar switches, this now requires an algorithm however, different from iSLIP since the structure of a shared-memory core is very different. It still permits to admit packets in switch core while the corresponding output ports are not yet available thus, maintaining the flexibility of shared-memory versus crossbar.

There is however a need for an algorithm that allows to keep the amount of resources of switch core to a level that is implementable in an available technology, an objective which can no longer be reached with the simple backpressure flow control mechanism of prior art.

The accomplishment of these and other related objects is achieved by a method of selecting requests to be acknowledged in a collapsed virtual output queuing array (cVOQ) of a shared-memory switch core adapted to switch packet from a plurality of ingress port adapters to a plurality of egress port adapters, each of said ingress port adapters including an ingress buffer comprising at least one virtual output queue per egress port to hold incoming data packets, each of said ingress port adapters being adapted to send a transmission request when a data packet is received, said cVOQ comprised of an array of individual counters, each of said counters counting the number of packets waiting in a different virtual output queue of said ingress port adapters, said method comprising:
  determining a degree of freedom for each row and each column of said array of individual counters;
  determining a maximum number of requests to be acknowledged;
  excluding from selection those of said rows and columns with zero degree of freedom;
  selecting a subset of rows and columns with a same lesser degree of freedom, said selecting further comprising:
    picking, if possible, a combination of one row and one column for which an acknowledgment will be returned to corresponding virtual output queue;
    excluding from selection all row or column selections tried by said picking;
  resuming at selecting while said maximum number is not reached and subset of rows or columns is not empty.

Further objects, features and advantages of the present invention will become apparent to the ones skilled in the art upon examination of the following description in reference to the accompanying drawings. It is intended that any additional advantages be incorporated herein.

BRIEF DESCRIPTION OF THE DRAWINGS

FIG. 5, comprising

FIG. 6, comprising

DETAILED DESCRIPTION OF AN EMBODIMENT OF THE INVENTION

Figure 1:
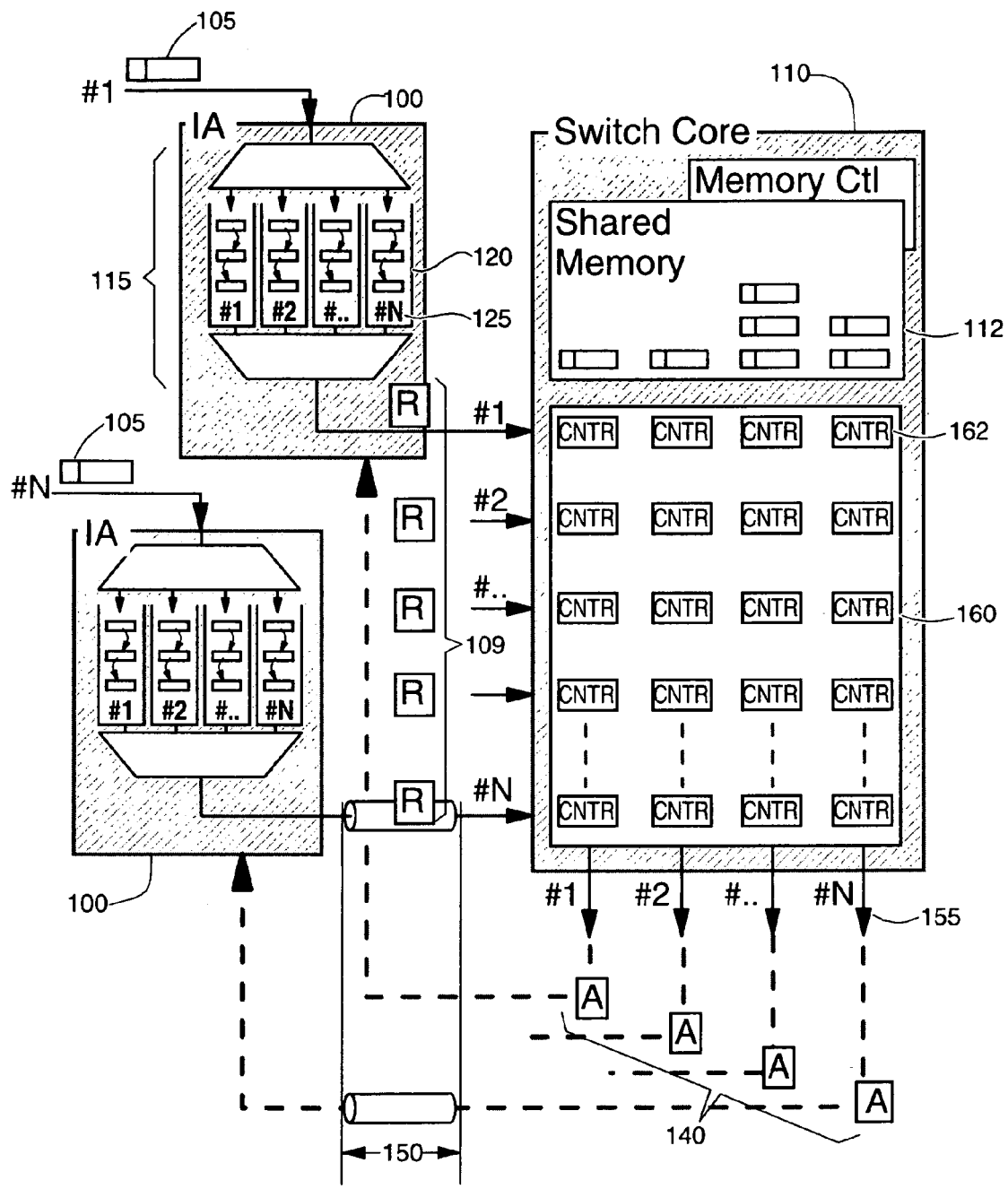
FIG. 1 depicts a switch fabric that uses a switch core implementing a collapsed virtual output queuing array (cVOQ).

FIG. 1 depicts a switch fabric that uses a switch core (110) implementing a collapsed virtual output queuing array (160) referred to as cVOQ in the following description of the invention. The mode of operation of a such a fabric assumes that acknowledgments (140) are returned to all ingress port adapters or IA's (100) to authorize the forwarding of incoming data packets (105) temporarily stored in queues such as (120). IA's queues are organized to form a 'virtual output queuing' or VOQ (115), a scheme well-known from the art of switching to prevent any form of 'head of line' (HoL) blocking in fabrics implementing ingress queuing. FIG. 1 shows that queues of a VOQ are organized per destination (125). In the general case there are however as many queues as flows of packets supported by the switch fabric IA's. A flow is thus generally characterized not only by a destination or output port (155) but may optionally include many other parameters. Most often, there is also at least a queuing per priority or 'class of service' (CoS). Without any loss of generality, for a sake of clarity, FIG. 1 shows only a few queues, one per output port 1 to N (125). Then, cVOQ array (160), situated in fabric switch core, maintains an image of all the queues of all IA's (100). Each ingress queue, like (120), has thus a counterpart in cVOQ e.g., in the form of an up/down counter (162) that holds the number of packets waiting in the IA corresponding queue. Counters are incremented on reception of requests (109) issued immediately with each received packet (105). Hence, switch core cVOQ holds all the necessary information to make a decision, at each packet cycle, of which requests should be best acknowledged to always prevent congestion of switch core.

Figure 2:
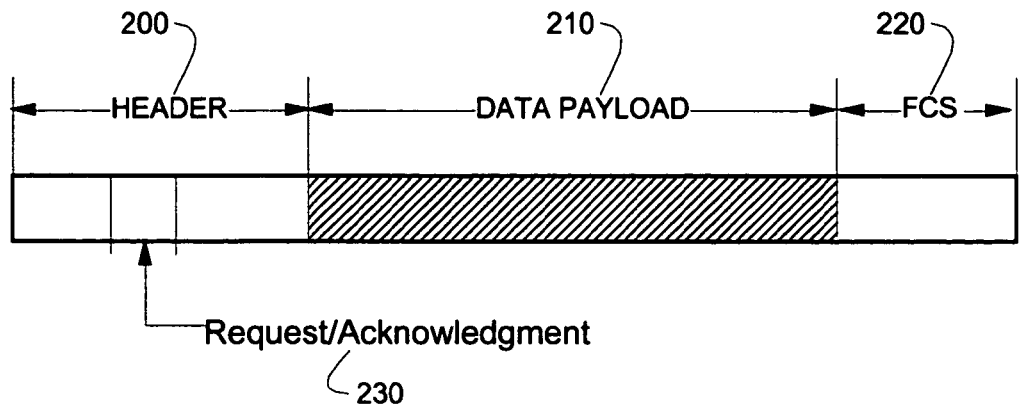
FIG. 2 explained how requests and acknowledgments, necessary to operate a switch fabric according to the invention, are exchanged between Ingress Adapters (IA's) and □cVOQ of switch core.

FIG. 2 explained how requests and acknowledgments, necessary to operate a switch fabric according to the invention, are exchanged between IA's and cVOQ of switch core. In a preferred mode of realization, requests and acknowledgments are assumed to be carried in the header of each packet entering or leaving the switch core. Indeed, packets are continuously exchanged between adapters and switch core. In the kind of switches considered by the invention numerous high speed (multi-Gbps) links must be used to implement the port interfaces. Even though there is no traffic through a port at a given instant, to keep links in synch and running, idle packets are exchanged instead when there is no data to forward or to receive. Whichever packets are 'true' packets i.e., carrying user data, or are idle packets they are comprised of a header field (200) and a payload field (210) this later being significant, as data, in the user packet only. There is also, optionally, a trailing field (220) to check the packet after switching. This takes the form of a FCS (Field Check Sequence) generally implementing some sort of CRC (Cyclic Redundancy Checking) or checking over packet content. Obviously, idle packets are discarded in the destination device after the header information they carry is removed.

Hence, there is a continuous flow of packets in both directions, idle or user packets, on all ports between adapters and switch core. Their headers can thus carry the requests and acknowledgments in a header sub-field e.g., (230). Packets entering the switch core thus carry the requests from IA's while those leaving the switch core carry the acknowledgments back to IA's. Each packet (idle or user) is thus assumed to be able to piggyback carry (exclusively) one request or one acknowledgment.

In general, headers thus contain all the necessary information to process packets by the destination devices i.e., switch core or IA's. Typically, for packets to the switch core, this includes the egress port through which packets are due to exit switch core and the associated priority or CoS. More information must be in general included in headers like e.g., the fact that packets are unicast or multicast which implies a routing index or flow ID to be transported too.

On the contrary of the rest of the header the Request/Acknowledgment sub-field (230) is thus foreign to the current packet and refers to a packet waiting in an ingress adapter queue. Therefore, Request/Acknowledgment sub-field must unambiguously references the queue concerned by the request or acknowledgment such as (120) in FIG. 1.

Figure 3:
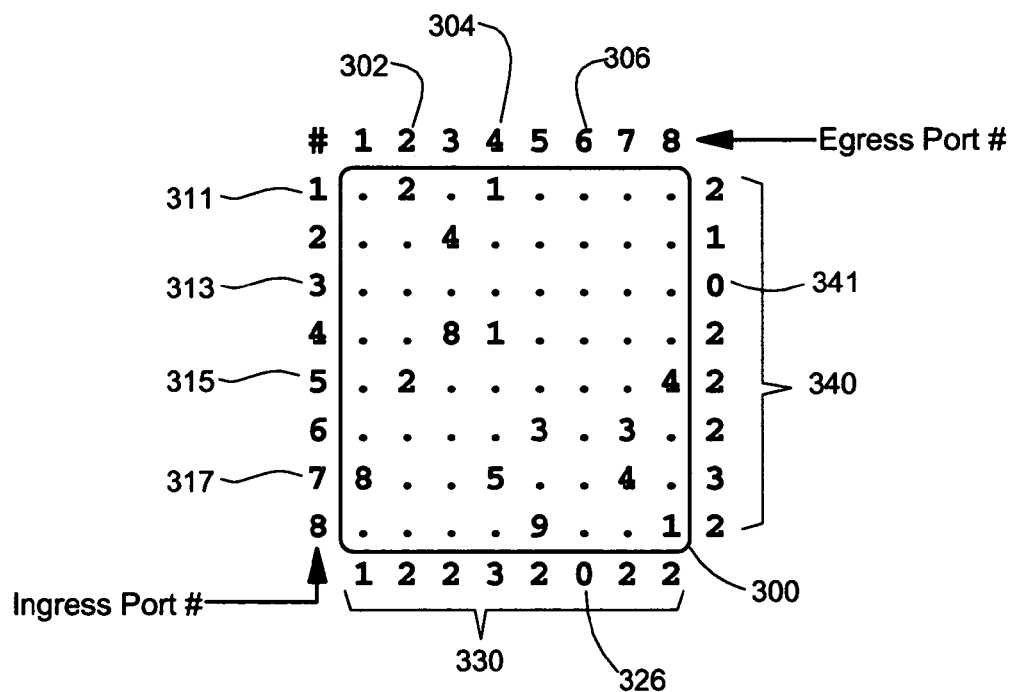
FIG. 3 is an example through which the overall request selection method is illustrated.

FIG. 3 is an example through which the overall request selection method is hereafter illustrated. Without any lack of generality and for a sake of simplicity it is first assumed, in this example, that switch core has only 8 ports and packets are all of the same priority.

As a consequence, cVOQ array i.e., (160) in FIG. 1, reduces to a single 8×8 matrix of counters. At a given packet-cycle, cVOQ counter values are e.g., those shown (300). That is, second queue, holding packets for egress port #2 (302) in IA connected to port #1 (311) contains, according to current counter state, two packets that have not been acknowledged yet. Hence, switch core knows there are at least two packets waiting, in IA #1, to be switched through egress port #2 (302). It must be kept in mind that, because of the propagation delays, more packets could be already waiting in IA of which switch core is not informed though. This is the case whenever there are on-fly requests, on their way through cables and wiring to the switch core however, that have not been received and processed by the core logic yet.

In the same row, i.e., from the same ingress adapter (the one connected to port #1), fourth counter shows there is also one packet destined for egress port #4 (304). And there are also packets waiting to be acknowledged from most of the other IA's except IA #3 (313) since the whole row of counters has null values in this case.

The number of IA's from which a packet can be picked by algorithm is shown (330) per column or egress port. Also shown, is the number of IA queues from which a packet can be picked per row (340) i.e., per IA. These numbers represent the degree of freedom of the algorithm when it exercises a choice. Zero means there is nothing to select i.e., no packet is waiting from that IA (341) or none is to transmit through that port (326). One means there is only one possibility and so on.

Thus, cVOQ array of counters (300) allows switch core to acquire a complete view of all packets in all IA's and waiting to be switched. Relevant individual counters are incremented, at each packet-cycle, with the incoming requests as shown in FIG. 1 (109), so as cVOQ array is permanently updated (after a delay corresponding to the propagation time of the packets through cables, and/or board and backplane wiring, including the process times of IA and switch core logics). Similarly, as it is further discussed, the issuing of acknowledgments back to the IA's i.e., (140) in FIG. 1, allows to decrement the selected counters.

In the particular example of FIG. 3, illustrating the selection algorithm according to the invention with a 8×8 single-priority switch, a maximum of eight requests and eight acknowledgments could thus be received, and sent back, at each packet-cycle since it was also assumed, in FIG. 2, that in header of each packet there is room for one request or (exclusively) for one acknowledgment (230).

Although the invention does not preclude that more room in headers (and possibly also in 'payload' of idle cells) would allow to transport more than one request or acknowledgment per packet) it is also an objective to limit packet overhead to what is strictly required by the mode of operation that assumes the exchange of one request and one acknowledgment prior to the actual switching of any packet. Thus, the rest of the description fits with this assumption.

Therefore, in cVOQ example of FIG. 3, if there is zero waiting packet (326), in any of the IA's, destined for egress port #6 (306), egress port #1 has waiting packets from IA #7 (317) while egress port #2 has waiting packets both in IA #1 (311) and in IA #5 (315). In this later case selection algorithm has thus the freedom of returning a request to either one.

From chosen cVOQ instance (300), it must now be clear that only seven acknowledgments (out of a maximum of 8 in this 8×8 switch example) can, and should, be returned to the relevant IA's since, one of them (313), has no waiting packet for any of the egress ports. Because the invention assumes there is room for only one acknowledgment in header of idle and user packets, flowing back from switch core to each IA, the algorithm must manage, in spite of this constraint, to always return the possible maximum number of acknowledgments at every packet-cycle. If it were not the case this would mean that the bandwidth available in the packet headers was not optimally used and full switching could not be guaranteed. In other words, if the returning of acknowledgments were somehow throttled, because of some algorithm limitations or for any other reason, the forwarding of packets would be in turn limited thus, limiting the actual switch throughput to less than its full capacity.

An other desirable objective of the selection algorithm is that it must tend to always spread the possible maximum number of acknowledgments over the maximum possible number of columns or egress ports. In example, as already noticed, there is no packet waiting for egress port #6 (326) hence, the seven acknowledgments that switch core can possibly sent back to IA's in example should, ideally, be spread over the seven non-null columns. When achievable this permits that the packets eventually received as a result of the sending of these acknowledgments, will not have to stay more than one packet-cycle in switch core since, addressing a set of exclusive egress ports, they will be able to exit switch core through a same cycle.

Figure 4:
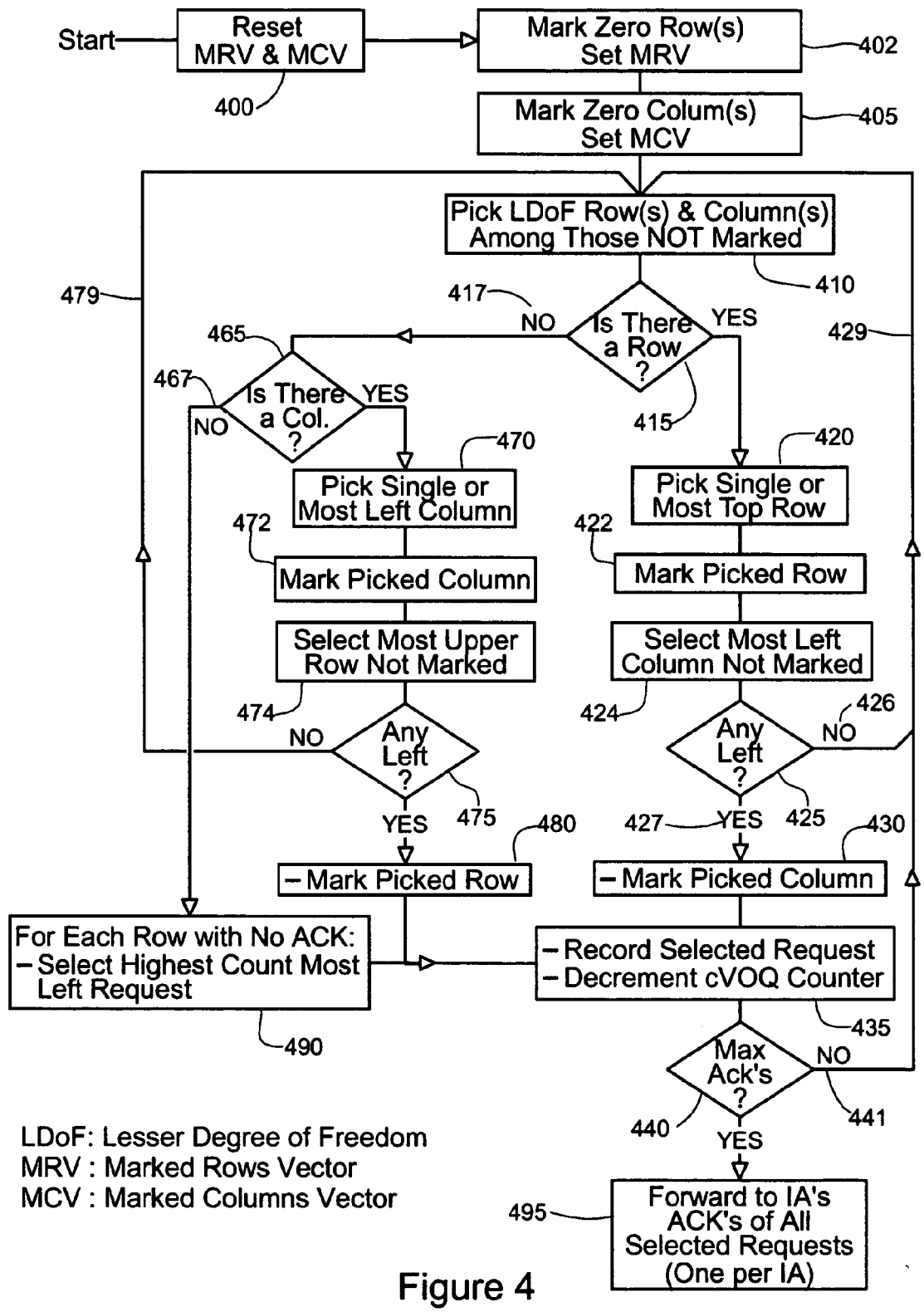
FIG. 4 are the steps of the selection algorithm that satisfies the requirements discussed in FIG. 3.

FIG. 4 are the steps of the selection algorithm that satisfies the requirements discussed in FIG. 3. In the description of FIG. 4 many references are thus also made to the cVOQ example of FIG. 3.

Algorithm excludes from the selection, rows (402) and columns (405) for which there is no waiting packet. To this end algorithm conceptually makes use of two binary vectors respectively referenced to as MRV (Marked Rows Vector) and MCV (Marked Columns Vector). Both vectors are reset (all zero's) at beginning of each algorithm loop (400). Then, each time a row or a column is picked by algorithm, while looping for choosing the requests to be acknowledged, the corresponding vector bit is set to one to remember what rows and what columns have been gone through. Vectors are thus 'marked'. Therefore, algorithm starts by setting MRV and MCV bits where there is no selection possible just because there is no waiting packet. In example of FIG. 3, at step (402) bit 3 of MRV is set since row #3 of cVOQ is empty (IA #3 has no packet for any of the egress adapters). Also, bit 6 of MCV is set at step (405) because there is no waiting packet, in any of the IA's, for egress port #6 (column #6 is empty).

To reach the main objective of always returning the maximum possible number of acknowledgments per packet cycle, so as to never waste any bandwidth, it should be clear that selecting among the requests must start where there is the least degree of freedom in the choice. After having eliminated the zero rows and columns the next step (410) consists in picking, among remaining rows and columns, a subset of those rows and columns that have the same lesser degree of freedom (LDOF) and from which the requests to be acknowledged will be first chosen. Clearly, these are row #2 and column #1 in example of FIG. 3 with only one possible choice.

Depending on what is the current combination of non-zero counters in cVOQ (300), any subset of rows and columns can, in practice, be found. Whichever combination is encountered next step consists in checking if there is a row (415) among the current subset of LDOF rows and columns. Rows are processed first. Single or most upper row is selected at next step (420). In the example, this is row #2 which is selected first. The selected row is marked (422). Then, for that row, algorithm selects (424) the single or most left column, not yet marked, if any is indeed left (427).

In the course of the execution of the algorithm it may well happen that all columns, for which current row has waiting packets, have already been selected. At this point no column selection can be done since this would imply that, for one of the egress port, more than one acknowledgment would have to be returned to IA's. This is further discussed in the following with the description of step (490). Hence, at this stage, if there is no column left (426), none are marked, and algorithm resumes at step (410).

If result of checking (425) is positive (427) column is marked (430). In chosen example, the only choice is column #3 since this IA has waiting packets for this egress port only. As a consequence of this choice, with chosen example, MCV bit 3 is set. Marking a row and a column implies that a new acknowledgment has just been selected. It is added to the set of acknowledgments that will be returned to IA's at completion of algorithm. Also, corresponding individual cVOQ counter must be decremented, and possibly reset, if there was only one waiting packet registered in that queue. This is done at step (435).

Next step (440) checks if the maximum number of possible acknowledgments has been reached. As discussed above this corresponds to the number of rows that have at least one waiting packet in one of the queues. In chosen example, there are seven non-zero rows (340) thus, this is the optimal number of acknowledgments that can be returned for the current instance of the algorithm. If this number is not reached algorithm resumes at step (410) too.

For each LDOF value, when there is no longer any row that can be tested, columns are tried (417). The steps for the columns are exactly the symmetrical of those for the rows. Columns and rows have their role exchanged. Therefore, acts (465), (470), (472), (474), (475), and (480) are identical to like acts previously described for rows and are not further described.

Finally, when all rows and columns have been tried (467) through the symmetrical loops (429) and (479), algorithm has achieved the objective of spreading the selected requests on an exclusive set of egress ports. If, simultaneously, the possible maximum number of acknowledgments is reached then, algorithm indeed succeeds to send back to IA's, in current packet-cycle, an ideal set of acknowledgments because the corresponding packets, each addressing a different port, are susceptible to eventually exit switch core in one packet cycle.

However, in the course of selecting the requests to be acknowledged some row or column selections may have been skipped at steps (425) or (475) because, for a given row or column, there was no possible choice left. In this case the possible maximum number of acknowledgments is not reached (441). When all rows and columns have been tried (417, 467) the last step of the algorithm (490) consists in completing the non-null rows i.e., IA's with waiting packets, that have not associated acknowledgment yet. Then, not to waste any header bandwidth, more acknowledgments must be selected to reach the possible maximum number. This is obtained however at the expense of sending, in current packet-cycle, more than one acknowledgment for at least one of the egress ports. The set of acknowledgments is thus not ideal however, no header bandwidth is wasted.

Step (490) can be carried out in many ways. In a preferred mode of realization of the invention, at completion of loops (429) and (479), in each non-zero row for which there is no acknowledgment yet, the highest count column is picked. If there are more than one, the most left of highest counts is picked. Hence, step (440) is eventually satisfied and acknowledgments to requests selected in current packet-cycle can be sent to all IA's that have at least one packet waiting to be switched.

If optional step (490) has been gone through, the current set of returned acknowledgments will bring in switch core at least two packets (from two different IA's) destined for a same egress port.

Figure 5A:
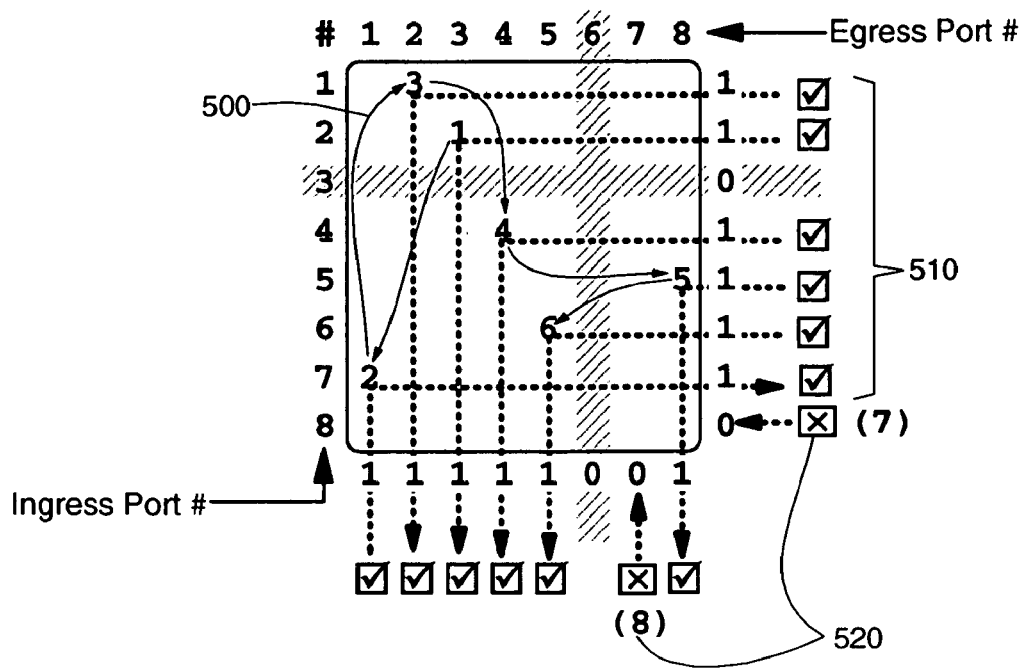
FIGS. 5a and 5b, shows how selection algorithm of FIG. 4 operates when applied on example of FIG. 3.
Figure 5B:
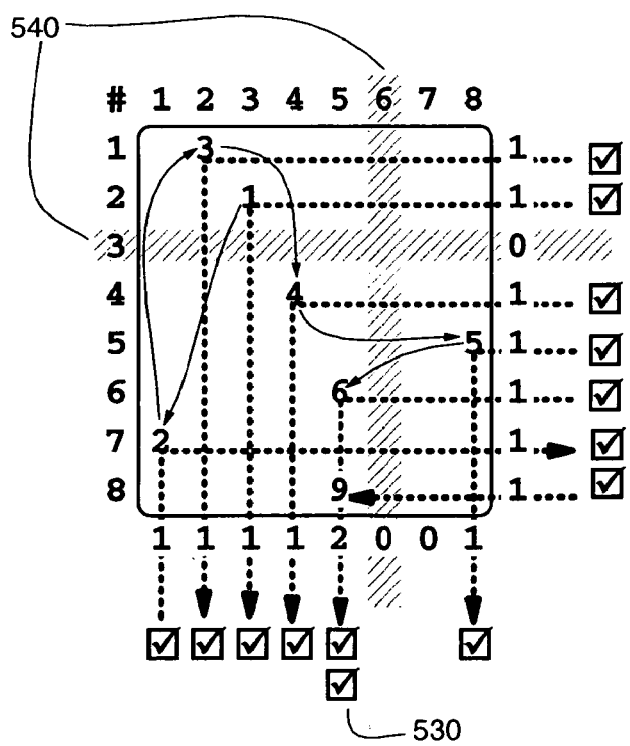

FIGS. 5a and 5b show how selection algorithm of FIG. 4 operates when applied on example of FIG. 3.

FIG. 5a shows the order (500) in which requests are selected by loops (479) and (429) starting, as already explained, with second row and 3rd column. Six rows are successfully selected (510). Seventh and eighth loop (520) fail selecting the last row since there are respectively no column (egress port) or row (IA) left that could be selected. Hence, this part of the algorithm fail selecting the possible maximum number of acknowledgments of this example i.e., 7.

FIG. 5b thus shows the result of the last selection step of the algorithm i.e., step (490) of FIG. 4. This step selects the highest count of last (yet unselected) row (530) so that two acknowledgments will be returned for port #5. One will come from IA #6 and the other one (the last selected) from IA #8.

As already noticed, row #3 and column #6 of example (540) do not participate to the selection since there are no packet waiting there. They were removed at steps (402) and (405) of algorithm on FIG. 4.

FIG. 6 discusses the efficiency of the algorithm in its ability to select an ideal set of acknowledgments.

Figure 6A:
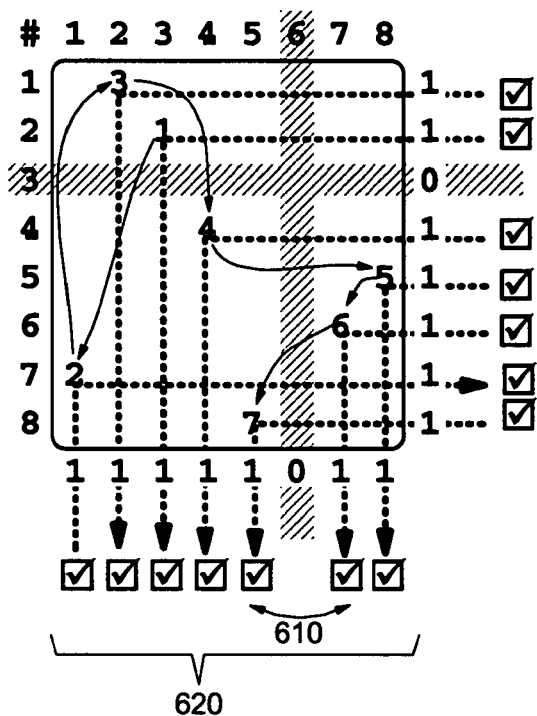
FIGS. 6a, 6b, and 6c, shows the efficiency of the algorithm in its ability to select an ideal set of acknowledgments.

The selection algorithm as shown in FIG. 4, does not guarantee that the optimal solution be always found. To illustrate this point with example of FIG. 3, one may notice that if columns had been selected in a different order (610) at 6th loop, algorithm would have succeeded in finding an ideal set of acknowledgments (620) as shown in FIG. 6a.

However, it is a strong practical requirement that algorithm has to remain simple enough to be implementable by hardware state machines and logic that must be capable of achieving a new selection at each packet-cycle. As an example, for a switch fabric of the current generation, equipped with 10 Gb/s ports, short fixed-size packets, typically 64-byte packets, must be processed in a range of a few tenths of Nanoseconds (25 Ns for ports operating actually at 20 Gb/s i.e., with a speedup factor of 2 over the nominal port speed).

Those skilled in the art will recognize that numerous modifications could thus be brought to the steps of the algorithm, as it is shown in FIG. 4, in an attempt to improve its efficiency while keeping it simple enough to allow its implementation in fast state machines. In example of FIG. 6a, instead of always picking the most left column at step (424), or the most upper row at step (474), a choice could be further exercised by noticing that it would be better, when possible, to rather select a column/row with a lesser degree of freedom for the same reasons as already discussed previously. Hence, the choice would have indeed been to select column #7 at step 6 (instead of column #5, the most left column) a solution that permits to converge to an ideal set of acknowledgments (620). This result would be obtained however at the expense of a more complex algorithm. This must be balanced against the complexity of implementation in light of the timing constraints mentioned above.

Figure 6B:
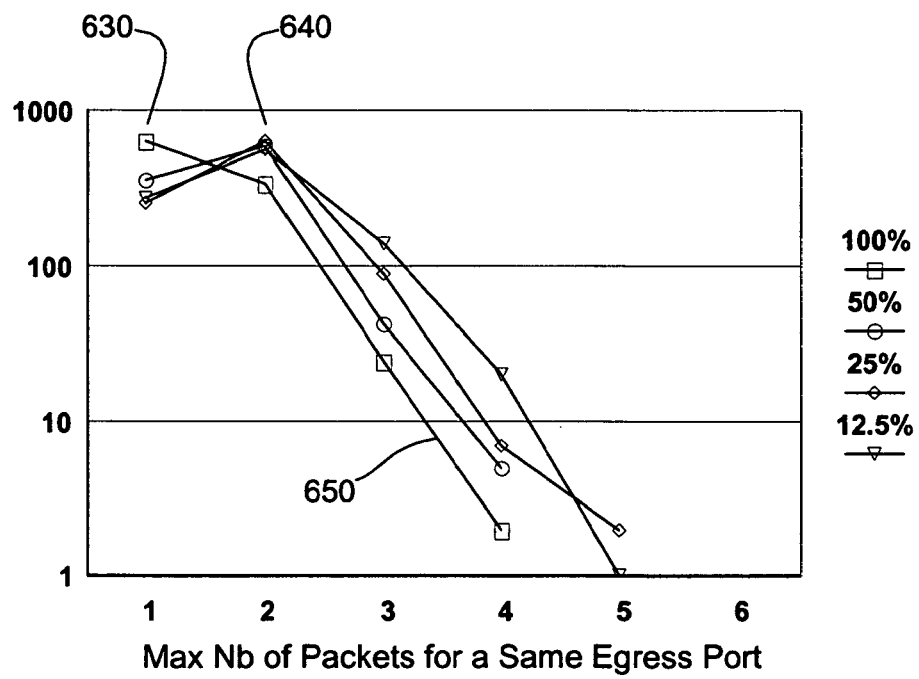

FIG. 6b plots statistical results obtained with algorithm as it is shown in FIG. 4.

Algorithm is applied on a cVOQ array of counters, such as (160) of FIG. 1, for switches ranging from 8×8 to 32×32 ports. Content of array of counters and switch number of ports are randomly withdrawn. To test the effect of the occupancy of the cVOQ array of counters the randomly selected number of counters, different from zero, is withdrawn over the totality of the counters or over a fraction of them in four categories: 0-0.125, 0-0.25, 0-0.5 and 0-1. One thousand samples are randomly withdrawn for each category. For the first category (0-0.125) a maximum of ⅛ of the IA queues can therefore have waiting packets to be switched while for the second category (0-0.25) up to ¼ of the queues may be non-empty and so on. In other words if switch is e.g., randomly chosen as a 16×16 port switch, its cVOQ array is made of 256 counters. If, for example, one considers the second category, a random withdrawing of their contents (and locations) limits to a maximum of 64 (256÷4) the number of counters that may be different from zero i.e., queues in IA's that have waiting packets. The thousands of random cases on which algorithm is applied is thus comprised of samples where 1 to 64 counters may have a value different from zero as far as the second category is concerned.

FIG. 6b thus plots the maximum number of packets per egress port found in the thousand instances of algorithm application in each category. Whichever category, there is always a significant number of cases (630) where algorithm is able to return an ideal selection of acknowledgments i.e., 1 packet per egress port. Often, the case shown in FIG. 5b is encountered, i.e., when there is at least one egress port in the current selection for which two acknowledgments have been selected (640). The number of occurrences of three and more acknowledgments for a same egress port decreases very rapidly (Y scale is logarithmic). The best results are obtained when traffic is statistically spread on up to 100% of the IA queues (650) as in first category. Obviously, when more queues have waiting packets there are more opportunities left to select an ideal set of acknowledgments.

Figure 6C:
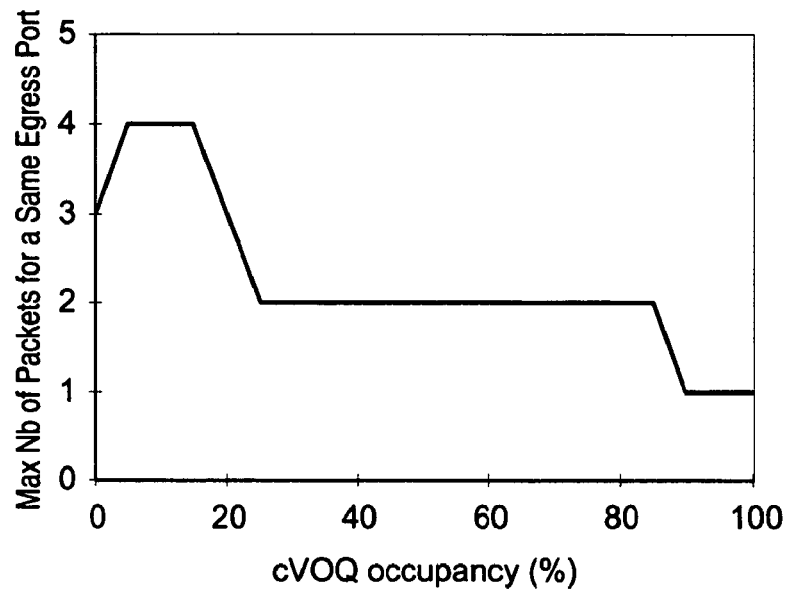

FIG. 6c confirms this result by plotting from the same data as used for FIG. 6b, the maximum number of packets found in a set of acknowledgments as a function of the actual occupancy of the array of counters (irrespective of their category) i.e., the number of counters having a count different from zero. This clearly shows that when approaching full occupancy all returned sets of acknowledgments are ideal (1 packet per egress port).

Figure 7:
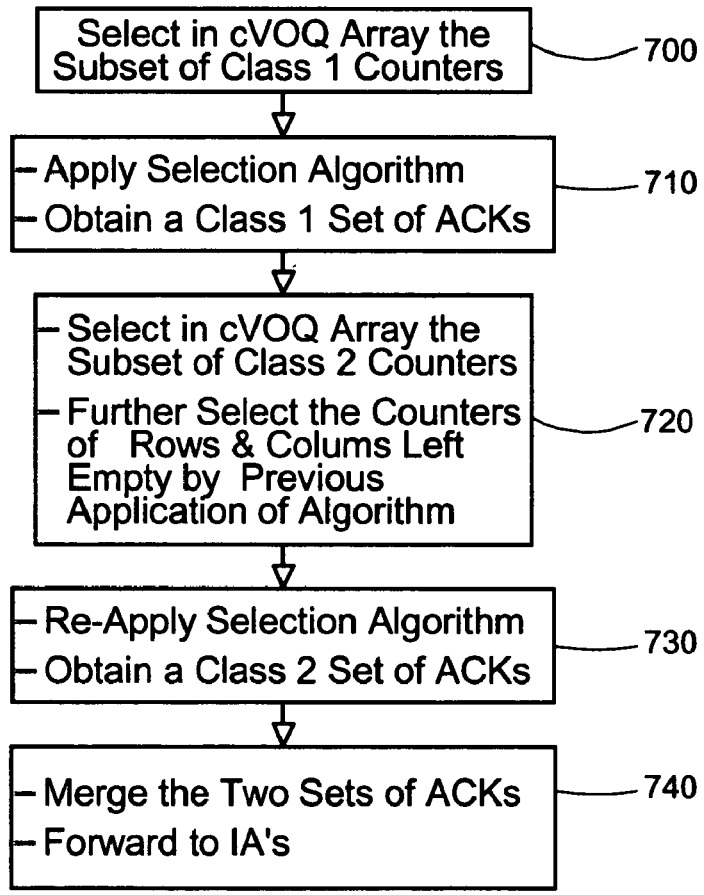
FIG. 7 depicts the handling of priorities and of flows of traffic by the selection algorithm.

FIG. 7 discusses the handling of priorities and of flows of traffic by the selection algorithm.

All switch fabrics of the kind considered by the invention are handling incoming traffic on the basis of how they have been classified by their originating device. Generally, this takes the form of a priority class. Packets are tagged in their headers with a different priority so as switch fabric knows which ones must be processed first. As already discussed packets belonging to a same class are queued together in IA's. Hence, in general, there will be several queues for a same egress port so, several counters in cVOQ array of counters. If it is far beyond the scope of the invention to determine how queues of various priority flows are going to be handled with respect to each other by the switch, it remains that a mechanism must exist in the acknowledgment selection process to give precedence to a class of cVOQ counters when necessary. The mechanism is hereafter described assuming that only two classes or two priorities are handled by switch core selection algorithm. Those skilled in the art will know how this can be generalized to any number of classes without any difficulty other than the practical problems raised by the implementation of too many classes in a necessarily limited hardware resource and for the very high port-speeds considered.

The two classes are referred to as Class 1 & Class 2. Class 1 is a higher priority class. Then, algorithm first selects the subset of Class 1 counters (700) on which the selection algorithm is applied (710). A Class 1 set of acknowledgments is thus obtained. Then, among the subset of Class 2 counters, a further selection is performed to keep only the counters at intersections of rows and columns left empty (720) by the previous application of algorithm. On remaining counters the selection algorithm is applied again so as to obtain a Class 2 set of acknowledgments (730) which are merged before forwarding to IA's (740). Obviously step (495) of algorithm of FIG. 4 is done only once with the handling of the last priority.

As a matter of fact, second selection of Class 2 counters could return an empty set of counters because there are no row or column left by the first application of the algorithm or because the remaining rows and columns have no Class 2 counters that overlaps.

The opposite may be true as well (the first set is empty) just because there is simply no Class 1 traffic at a given packet cycle in any of the IA's.

It must be pointed out that the algorithm according to the invention specifically permits that some row(s) and columns (s) be excluded temporarily from selection. This can be carried out to give precedence to some flows or CoS for a while e.g., to warrant them a minimum switching bandwidth (thus, excluding rows corresponding to lower priority flows or CoS). Excluding columns from selection allows to prevent the accumulation of packets in shared-memory for a same egress port. For example, if a current selection of acknowledgments returned to IA's is such that it will eventually bring more than one packet for a same egress port (non-ideal selection) then, column selection for that egress port, can be excluded for a number of subsequent packet-cycles corresponding to the number of packets in excess of one in the current selection. Hence, no accumulation of packets can occur even though selection of acknowledgments are not ideal.

It is also worth noting here that, in a switch fabric handling at least two classes of services it could be preferred to defer the execution of step (490) of algorithm of FIG. 4 until the lowest priority is processed. Indeed, the only purpose of this step is to complete the number of acknowledgments so as no packet headers bandwidth is wasted. Hence, this can be achieved by acknowledgments of a lower priority class without any inconvenience since if two packets, or more, of a same priority, are queued for a same output port in a same set of acknowledgments, one will have anyway to wait one more cycle in switch core while an acknowledgment for a free egress port could have been returned instead and processed in the same cycle. Therefore, in a multi-priority switch, step (490) should better be executed only once, with the process of the lowest priority however, still completing the set of acknowledgments, when necessary, with highest priority ones.

Finally, it must be observed that the selection of classes of traffic, implying a notion of priority, may be replaced by a notion of traffic type that would have to be handled successively however, not necessarily always in the some order, so as all traffic types would be, on the average, equally treated or according to any weighted attribute. Hence, a round robin or weighted round robin selection of the subset of counters can be as well performed by the algorithm of FIG. 7.

In a multi-class type of switch fabric there are therefore even more opportunities to return an ideal set of acknowledgments at each packet cycle.

Figure 8:
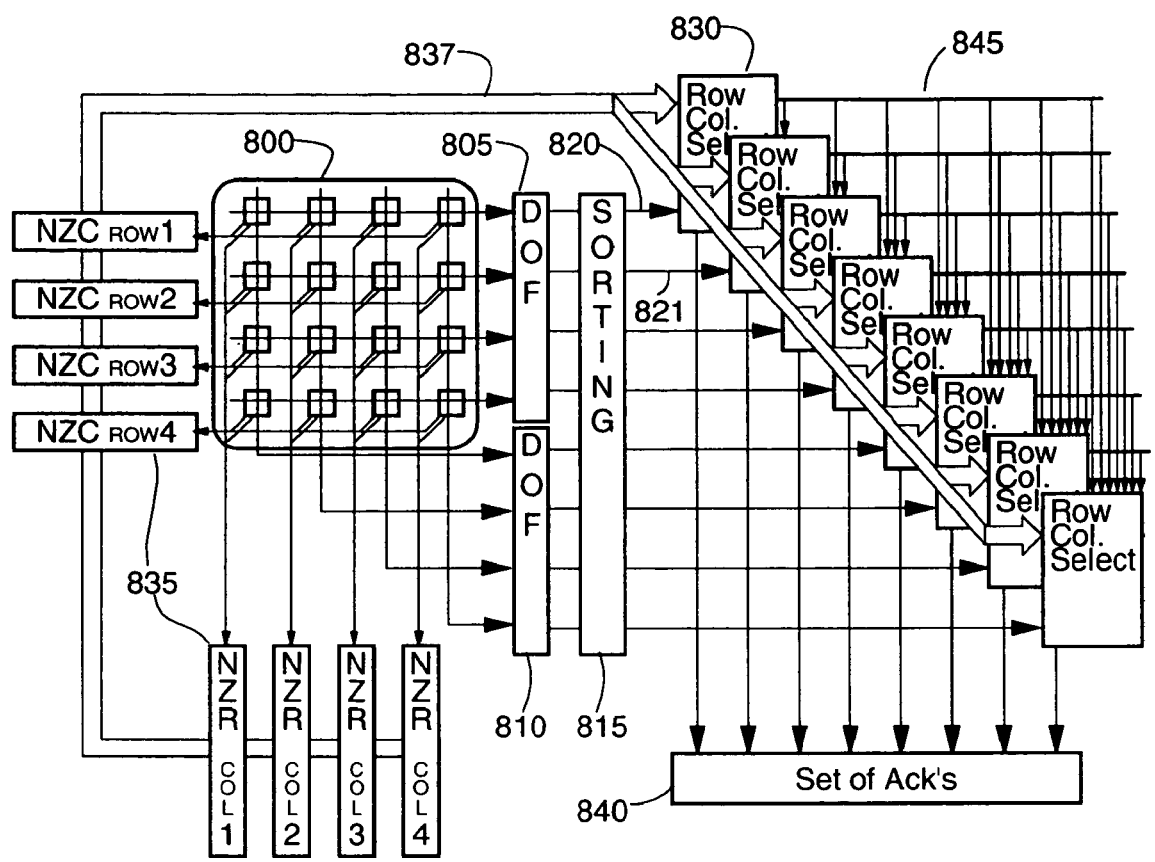
FIG. 8 shows the hardware implementation of the selection algorithm.

FIG. 8 discusses the hardware implementation of the selection algorithm.

As already mentioned, algorithm must be able to make a new choice of acknowledgments at each packet-cycle typically, with the current generation of switch fabrics, every 25

Nanoseconds for 64-byte packets received on 10 Gb/s ports with a speedup factor of 2 thus, actually operating at 20 Gb/s (overspeed takes care of various protocol overheads and can accommodate temporary bursts of peak traffic).

To reach this timing objective a great deal of parallelism is required because the number of available computing cycles is not high even in the most recent ASICs (application specific integrated circuits) generally used to implement such switch fabrics. Indeed, with an internal clock typically running at 500 MHz one cycle period is 2 Ns and the selection of a set of acknowledgments must thus be completed in 12 cycles.

The logic shown in FIG. 8 is aimed at overcoming the difficulties of implementation. Hence, instead of using a state machine to implement the steps of the selection algorithm of FIG. 4, combinatorial logic must be used. To keep drawing simple, FIG. 8 assumes a 4×4 switch thus, an array of 16 counters per class of traffic (800). For rows and columns two simple blocks of logic (805, 810) determine their degree of freedom (DoF). That is, for each row/column the number of their non-zero counters is computed. Together, this form a vector of 4+4=8 values ranging from 0 to 4 since we may have anything between 0 and 4 counters with a value different from 0 in a row or a column. Vector is presented to a sorting network (815). Sorting combinatorial network uses techniques well known from those that are skilled in the art especially, logic designers and need not to be further described. On the subject of 'networks for sorting' one may refer e.g., to a book by D. E. Knuth, 'The Art of Computer Programming', Volume 3, Sorting and Searching, Chapter 5.3.4, 'Networks for sorting', Addison-Wesley, 1973. The role of sorting network is to bring to the top (820) the row or column reference number which has the lesser degree of freedom. Sorting network (815) is devised so that zero row and zero column are eliminated of the sorting, rows appear first when there are rows and columns with a same degree of freedom and, an upper row or a more left column is sorted first so as to comply with algorithm of FIG. 4. Therefore, on the upper line (820) the row or column reference which has a lesser degree of freedom appears. It is followed by second choice (821) i.e., a lower row or a column to the right of above one with a same degree of freedom or a row or column with a lesser degree of freedom and so on.

Then, logic block (830) which knows which row or column has a lesser degree of freedom, selects the corresponding Non-Zero-Columns (NZC) or Non-Zero-Rows (NZR) binary vector (835). Since a 4×4 switch is considered here, these are a set of 4-bit binary vectors with 1's where there are non-zero counters. Hence, logic block (830) can pick either the most left column or the most upper row and update the first choice of the set of acknowledgments (840) that will be returned to IA's at completion of current selection cycle.

The second of the logic blocks (831) operates identically on second choice (821) row or column. However, the row and column picked by the first block are removed (845) so as they cannot be picked again by the second block (picked rows and columns are thus 'marked' if one refers to algorithm of FIG. 4).

From top to bottom, picked rows and columns are progressively removed (845) from a possible selection by a lower situated logic block. The combinatorial logic of FIG. 8 thus implements the equivalent of the loop (429) and loop (479) of FIG. 4 under the form of a cascade of combinatorial (unclocked) row and column selection logic blocks (830).

Hence, it becomes possible to implement the selection-algorithm of the invention and meets the timing budget discussed above (25 Ns) in a switch core handling several classes of traffic. If as many as eight classes are considered then, proceeding as explained in FIG. 7, eight cycles permit to accumulate the acknowledgments for the eight priorities that must be successively processed. A few cycles are left to complete the work such as a final execution of step (490) as discussed in FIG. 7.

To reach higher performances e.g., to accommodate 40 Gb/s nominal port speed, or to handle even more classes of service, those skilled in the art will recognize that it is obviously possible to replicate the hardware logic of this figure so as it can operate in parallel on different sets of counters in order to expedite the selection of a set of acknowledgments.

All what has been discussed and described up to this point has however implicitly dealt only with unicast traffic i.e., traffic from one ingress port to one egress port. Multicast traffic, i.e., traffic where, preferably, switch core (and not the IA's) must replicate an incoming packet to multiple destinations and possibly all destinations (broadcast) is becoming increasingly important with the development of networking applications such as video-distribution or video-conferencing. It is worth noting at this point that the use of a shared memory, as this is assumed by the invention, indeed allows to replicate MC packets at a place where this consumes fewer resources since all necessary copies are withdrawn from a single transmitted packet hold in shared memory. Moreover, replication need not to be performed in a same packet-cycle as it is the case with a crossbar switch core.

Multicast has traditionally been an issue in packet switches because of the intrinsic difficulty to handle all combinations of destinations without any restriction. As an example, with a 16-port fabric there are possibly 216-17 combinations of multicast flows i.e., about 65 k flows. This number however reaches four billions of combinations with a 32-port switch (232-33). Even though it is never the case that all combinations need and can be used simultaneously there must be, ideally, no restrictions in the way multicast flows are allowed to be assigned to output port combinations for a particular application. Hence, unicast switch fabric shown in FIG. 1 must be adapted to also handle MC traffic. This is done as illustrated on FIG. 9, with only one more queue (928). One MC queue is generally dedicated for all multicast packets (per IA and per CoS though) first, because it is in practice impossible to implement all combinations of multicast flows each with their own queue, and also because it does not really help to have only a limited number of MC queues due to the multiplicity of possible combinations as discussed above. It is a well established result that having a few MC queues does not really help much unless to have as many queues as MC flows. Again, this is in practice, in most applications, impossible to implement thus, one ingress queue is generally used. On this, one may for example refers to following paper: 'Tiny Tera: A Packet Switch Core', by Nick McKeown et al., IEEE Micro, January/February 1997, pages 26-33.

Hence, MC queues have also their counterparts in cVOQ (960) under the form of a column of MC counters (970) similar to the UC counters (965). However, while UC counters all are implicitly tied to a single egress port e.g., (965) the column of MC counters (970) potentially address any combination of the output ports (980).

Therefore, MC counters cannot be integrated with the other UC counters on which algorithm of FIG. 4 would be globally applied. They must be treated as a class of counters by themselves. Hence, they are processed, as explained in FIG. 7, as another priority class. A subset array of counters, as this is defined in this figure, thus reduces to the column of MC counters (970). Then, selection becomes trivial in this case since it only consists in picking the rows for which an MC acknowledgment will be returned.

Depending on the importance given to MC traffic vs. unicast in a particular application of the invention supporting both types of traffic, MC traffic may be selected first, or after UC algorithm is applied thus, on the remaining rows, and MC and UC acknowledgments merged as explained in FIG. 7. Or, MC traffic may be given priority at regular intervals. Also, step (490) of algorithm of FIG. 4 gives the opportunities of merging UC and MC acknowledgments.

Those skilled in the art will have recognized that algorithms according to the invention are flexible enough to be adapted to many different applications thus, including the cases where both types of traffic (UC and MC) must be handled simultaneously.

As final remarks, it must be pointed out first, that the invention does not preclude the use of more than one single MC queue. As many as necessary MC queues may be considered. Each could be considered as a class in itself, as it is assumed above, and handled as explained in FIG. 7. If MC or other queues of same importance would have however to be considered algorithm of FIG. 7 can be trivially adapted to round robin between a set of queues, at a same level of priority, so as none of them would be overall advantaged.

Figure 9:
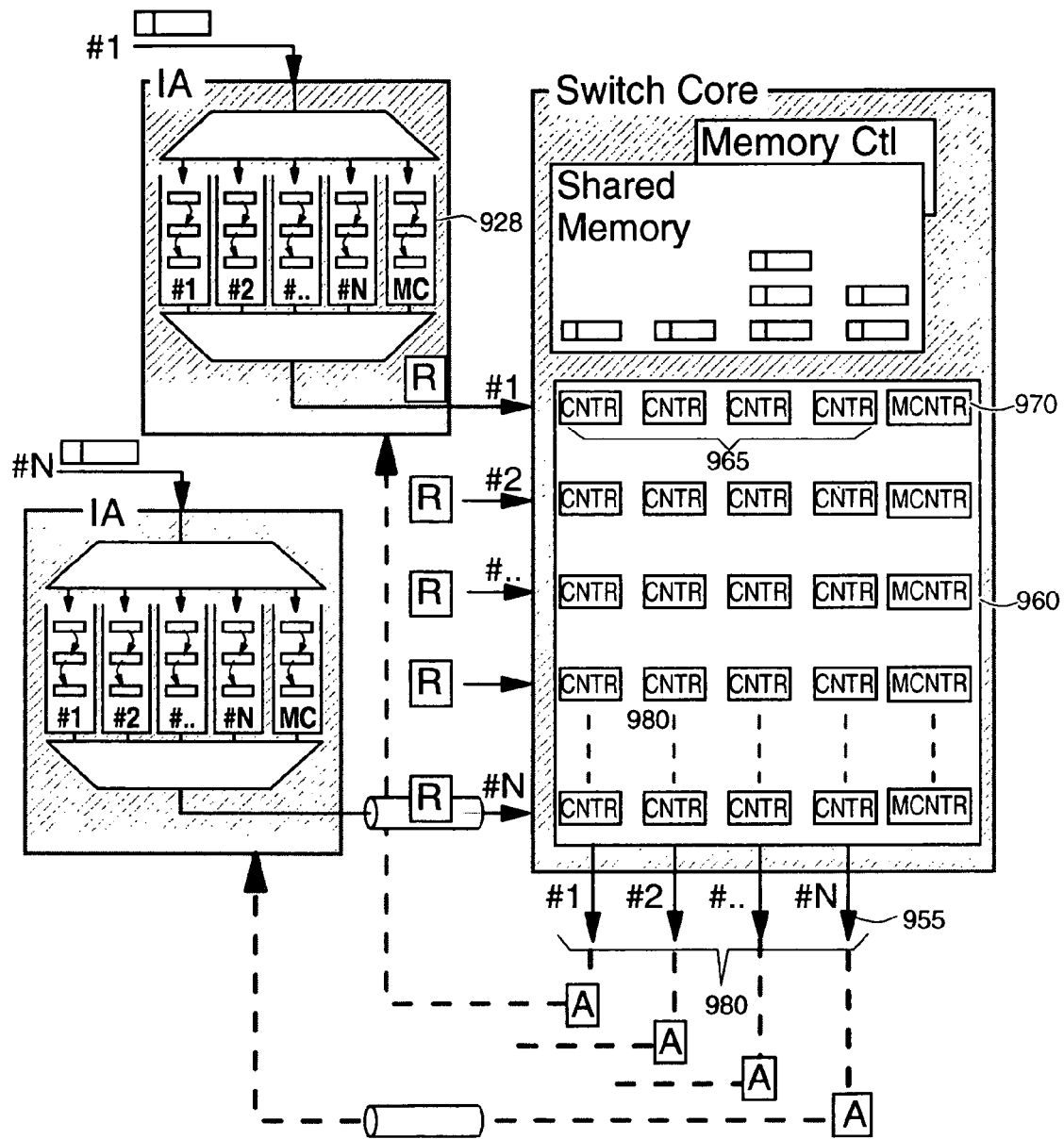
FIG. 9 shows a switch fabric that uses a switch core implementing a collapsed virtual output queuing array (cVOQ), adapted to handle multicast traffic.

Secondly, one will have noticed that cVOQ including MC counters, as described in FIG. 9, does not assume that switch core acquires the knowledge of what output ports are actually concerned by the MC requests. Thus, MC requests must be treated in switch core as if all ports are to be eventually used by the MC packets on behalf of which requests were issued. At the expense of complicating the switch core and cVOQ, it is however possible to forward this information with the requests. Then, return of MC acknowledgments can be further adapted to use the extra information and selects a better set of acknowledgments to be returned.

Again, algorithms according to the invention are flexible enough to be adapted to this latter case by those skilled in the art. This latter mode of operation can be justified for applications of the invention where multicasting is predominant like with video-distribution and video-conferencing.

What is claimed is:

1. A method of selecting requests to be acknowledged in a shared-memory switch core comprising:
    providing, in the shared-memory switch core, a collapsed virtual output queuing array (cVOQ) comprising counters arranged in predefined rows and columns, wherein the shared-memory switch core is adapted to switch packets from a plurality of ingress port adapters to a plurality of egress port adapters, and wherein the shared-memory switch core is configured to receive a packet in a period of time that an output through which the packet is to exit is unavailable;
    determining a number of queues assignable to each egress port adapter;
    determining a number of queues received from each ingress port adapter;
    determining a degree of freedom for each row and each column of said array of individual counters in response to the determined number of queues assignable to each said egress port adapter and the determined number of queues received from each said ingress port adapter, the degree of freedom indicating the number of choices to assign a queue to one of said egress port adapters;
    determining a maximum number of requests to be acknowledged;
    excluding from selection those of said rows and columns with zero degree of freedom;
    selecting a subset of rows and columns with a same lesser degree of freedom, said selection further comprising:
    picking, if possible, a combination of one row and one column for which an acknowledgment will be returned to corresponding virtual output queue;
    excluding from selection all row or column selections tried by said picking;
    assigning a queue received from an ingress port adapter corresponding to the picked row to an egress port adapter corresponding to the picked column; and
    repeating at selecting if said maximum number is not reached and subset of rows or columns is not empty.

2. The method of claim 1 wherein said degree of freedom represents the number of non-zero counters in said each row or column.

3. The method of claim 2 further comprising, if said maximum number is not reached: completing the set of said acknowledgments for the rows for which none acknowledgment is returned by said picking.

4. The method of claim 3 wherein said completing comprises the selecting a column with a highest count of waiting packets.

5. The method of claim 3 wherein said completing comprises the selecting rows of multicast requests.

6. The method of claim 2 wherein said picking comprises: first trying, from top to bottom, the rows with a same lesser degree of freedom if any is remaining in said subset; then trying, from left to right, the columns with a same lesser degree of freedom if any is remaining in said subset.

7. The method of claim 6 wherein said trying each further comprising selecting respectively a column from left to right or a row from top to bottom to pick a combination of one row and one column.

8. The method of claim 7 wherein said further selecting is replaced by the selecting respectively a column or a row with a lesser degree of freedom to pick a combination of one row and one column.

9. The method of claim 1, further comprising, if said maximum number is not reached: completing the set of said acknowledgments for the rows for which none acknowledgment is returned by said picking.

10. The method of claim 9 wherein said completing comprises the selecting a column with a highest count of waiting packets.

11. The method of claim 9 wherein said completing comprises the selecting rows of multicast requests.

12. The method of claim 1 wherein said picking comprises: first trying, from top to bottom, the rows with a same lesser degree of freedom if any is remaining in said subset; then trying, from left to right, the columns with a same lesser degree of freedom if any is remaining in said subset.

13. The method of claim 1 comprising: selecting a subset array of counters from said array of individual counters; and obtaining a partial set of row and column combinations for which acknowledgments are returned.

14. The method of claim 13 wherein said selecting is done on the basis of a priority, class of service, flow identification or traffic type to which said subset array of counters belongs.

15. The method of claim 14 comprising: further selecting a subset array of counters among the set of rows and columns not part of said partial set of row and column combinations; obtaining a new partial set of row and column combinations for which acknowledgments are returned; merging said new partial set in said partial set; and keep further selecting a subset array of counters until all classes of traffic have been tried and there are rows and columns for which none acknowledgment is returned which are not part of said partial set.

16. The method of claim 15 wherein said further selecting is performed in a round robin or weighted round robin order among said subsets of counters.

17. The method of claim 16 wherein the maximum number of requests to be acknowledged is determined by the number of ingress port adapters holding at least one packet.

18. A system, comprising:
a plurality of ingress port adapters;
a plurality of egress port adapters; and
a shared-memory switch core configured to switch packets from the plurality of ingress port adapters to the plurality of egress port adapters, wherein the shared-memory switch core is configured to generate acknowledge signals in response to request signals of the plurality of ingress port adapters, and wherein the shared-memory switch cored comprises an array of counters, and wherein the array of counters represent Virtual Output Queues (VOQ) of at least one adapter associated with the shared-memory switch core, and wherein the shared-memory switch core is configured to determine a number of queues assignable to each egress port adapter, determine a number of queues received from each ingress port adapter, and determine a degree of freedom for each row and each column of the array of counters in response to the determined number of queues assignable to each said egress port adapter and the determined number of queues received from each said ingress port adapter, the degree of freedom indicating the number of choices to assign a queue to one of said egress port adapters, and wherein the shared-memory switch core is configured to determine a maximum number of acknowledgments to be issued in response to requests of the plurality of ingress port adapters, and wherein the shared-memory switch core is configured to exclude from selection rows and columns having zero degrees of freedom, and assign a queue received from an ingress port adapter corresponding to the picked row to an egress port adapter corresponding to the picked column; and wherein the shared-memory switch core is configured to select requests to which acknowledgments are being spread over a maximum number of columns of egress ports of the egress port adapters.

19. The system of claim 18 wherein the shared-memory switch core is configured determine the degree of freedom by tallying the number of counters in each row and each column having a value greater than zero.

20. An apparatus, comprising:
a shared-memory switch core configured to switch packets from a plurality of ingress port adapters to a plurality of egress port adapters, wherein the shared-memory switch core is configured to generate acknowledge signals in response to request signals of the plurality of ingress port adapters, and wherein the shared-memory switch cored comprises an array of counters, and wherein the array of counters represent Virtual Output Queues (VOQ) of at least one adapter associated with the shared-memory switch core, and wherein the shared-memory switch core is configured to determine a number of queues assignable to each egress port adapter, determine a number of queues received from each ingress port adapter, and determine a degree of freedom for each row and each column of the array of counters in response to the determined number of queues assignable to each said egress port adapter and the determined number of queues received from each said ingress port adapter, the degree of freedom indicating the number of choices to assign a queue to one of said egress port adapters, and wherein the shared-memory switch core is configured to determine a maximum number of acknowledgments to be issued in response to requests of the plurality of ingress port adapters, and wherein the shared-memory switch core is configured to exclude from selection rows and columns having zero degrees of freedom, and assign a queue received from an ingress port adapter corresponding to the picked row to an egress port adapter corresponding to the picked column; and wherein the shared-memory switch core is configured to select requests to which acknowledgments are being spread over a maximum number of columns of egress ports of the egress port adapters.

* * * * *